United States Patent
Zheng

[11] Patent Number: 5,477,465
[45] Date of Patent: Dec. 19, 1995

[54] MULTI-FREQUENCY RECEIVER WITH ARBITRARY CENTER FREQUENCIES

[75] Inventor: Baohua Zheng, St. Louis, Mo.

[73] Assignee: Talx Corporation, St. Louis, Mo.

[21] Appl. No.: 115,343

[22] Filed: Aug. 31, 1993

[51] Int. Cl.$^6$ ................................................ G01R 23/00
[52] U.S. Cl. ........................................ 364/485; 364/724.08
[58] Field of Search ...................................... 364/485, 484, 364/715.04, 726, 724.08, 724.09

[56] References Cited

U.S. PATENT DOCUMENTS

| | | | |
|---|---|---|---|
| 3,932,737 | 1/1976 | Delepine | 364/484 |
| 4,025,730 | 5/1977 | Sawai | 364/724.08 |
| 4,066,881 | 1/1978 | Houdard | 364/726 |
| 4,080,661 | 3/1978 | Niwa | 364/726 |
| 4,211,897 | 7/1980 | Ichikawa et al. | 364/724.08 |
| 4,223,185 | 9/1980 | Picou | 364/726 |
| 4,435,774 | 3/1984 | Claasen et al. | 364/726 |
| 4,460,806 | 7/1984 | Canniff et al. | 179/18 EB |
| 4,567,328 | 1/1986 | Carrasco et al. | 179/2 A |
| 4,586,174 | 4/1986 | Wong | 370/69.1 |
| 4,674,111 | 6/1987 | Monet et al. | 379/58 |
| 4,833,399 | 5/1989 | So | 324/79 D |
| 4,839,917 | 6/1989 | Oliver | 379/45 |
| 4,990,848 | 2/1991 | So | 324/79 R |
| 5,010,399 | 4/1991 | Goodman et al. | 358/85 |
| 5,083,312 | 1/1992 | Newton et al. | 381/68.4 |
| 5,109,417 | 4/1992 | Fielder et al. | 364/715.04 |
| 5,119,322 | 6/1992 | Stroobach | 364/724.09 |
| 5,163,050 | 11/1992 | Cromack | 370/110.3 |
| 5,177,785 | 1/1993 | Itani et al. | 380/6 |
| 5,261,007 | 11/1993 | Hirsch | 364/484 |
| 5,272,446 | 12/1993 | Chalmers et al. | 364/724.08 |

OTHER PUBLICATIONS

"An Algorithm for the Evaluation of Finite Trigonometric Series," G. Goertzel, The American Math. Monthly, 1/58.
"Add DTMF Generation and Decoding to DSP–μP Designs," P. Mock Digital Signal Processing Applications with the TMS320 Family vol. 1, Texas Instruments, 1989.
Analog Devices, Digital Signal Processing Applications Using the ADSP–2100 Family, Prentice Hall, 1990.
Documentation for MITEL CM7291 Receiver Test Tape, Copyright 1973, 1980, MITEL Corporation.

Primary Examiner—Emanuel T. Voeltz
Assistant Examiner—Craig Steven Miller
Attorney, Agent, or Firm—Senniger, Powers, Leavitt & Roedel

[57] ABSTRACT

A multi-frequency receiver for detecting the presence of one or more of a plurality of m frequency tones in an incoming signal. A digital signal processor executes a fast algorithm for accurately calculating the spectral energies in a plurality of m frequency bands. Each frequency band is centered on one of the frequencies to be detected. The center frequencies of those bands are independent of the data length used. The calculated spectral energies are compared to a set of predefined thresholds. As a result, the presence of particular tones within the incoming signal are detected.

18 Claims, 5 Drawing Sheets

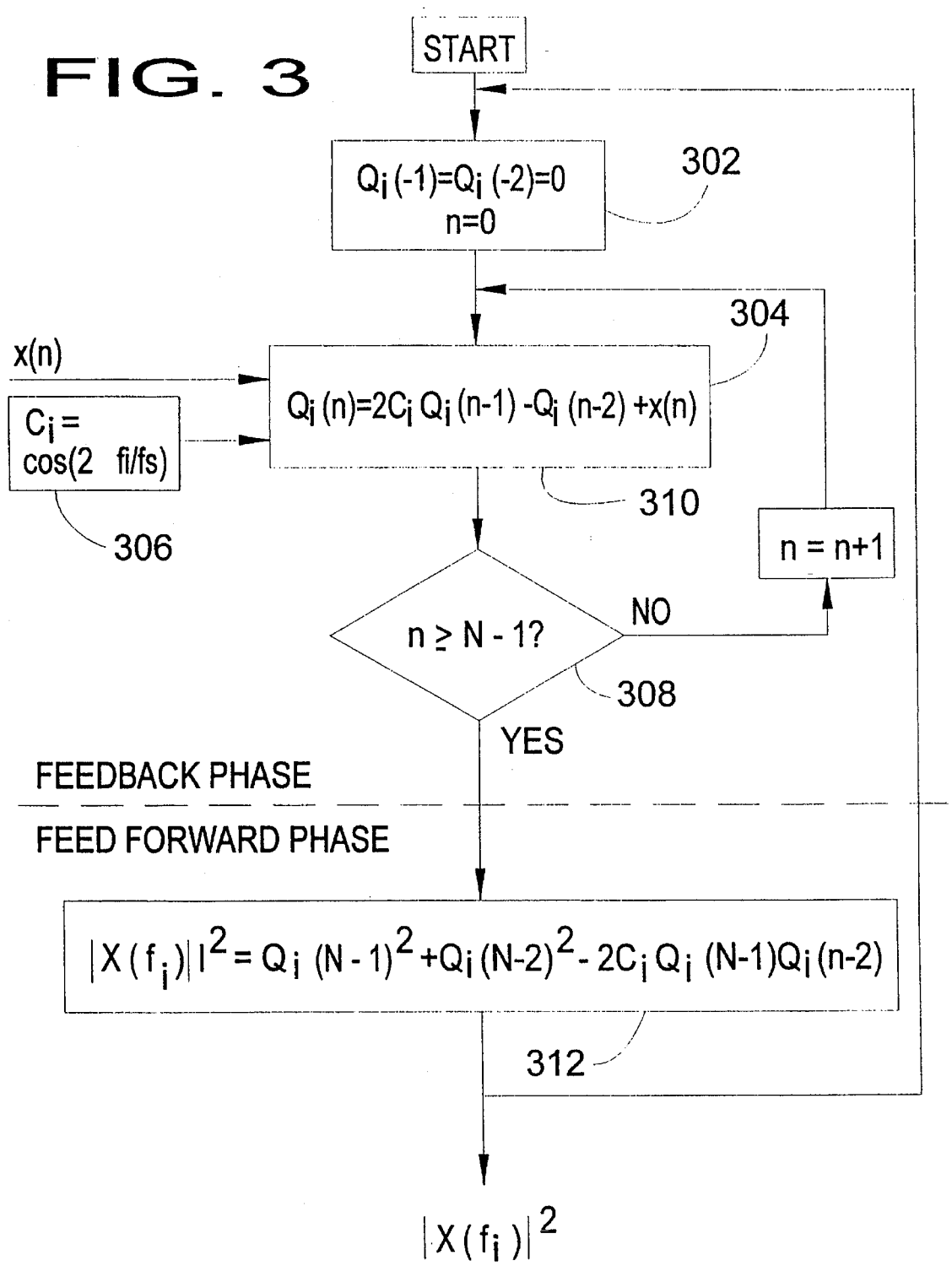

IMPLEMENTATION OF FEEDBACK PHASE

IMPLEMENTATION OF FEEDFORWARD PHASE

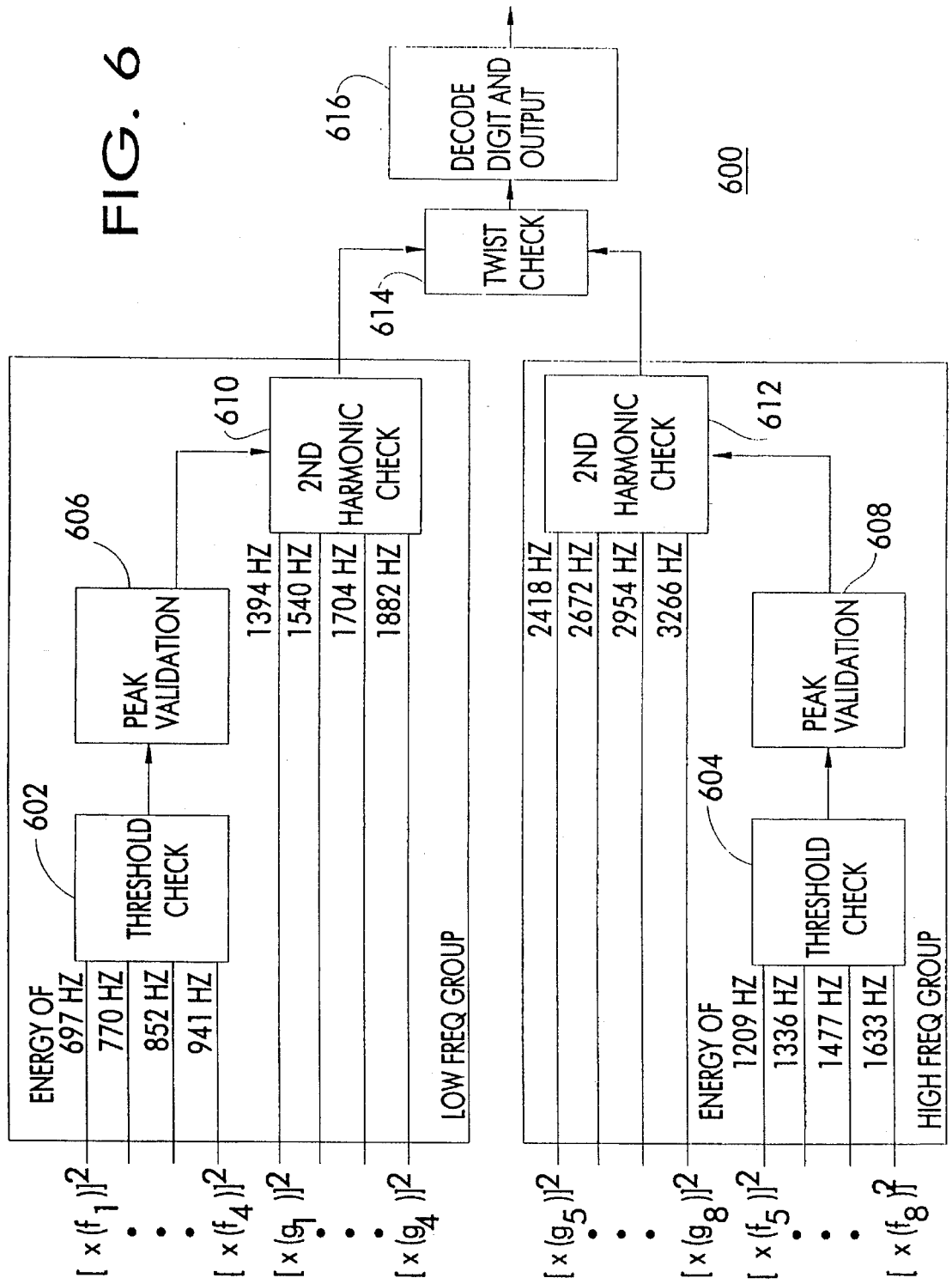

MULTI-FREQUENCY RECEIVER WITH ARBITRARY CENTER FREQUENCIES

BACKGROUND OF THE INVENTION

This invention generally relates to multi-frequency receivers and in particular, any type of signal processing in which the detection of specific frequency tones within a signal must be accomplished.

Two methods are generally used in digital multi-frequency tone receivers the digital filtering method and the Discrete Fourier Transform (DFT) method. In the filtering method, band-pass filters with centers located at those known frequencies are designed and the input signal is passed through those filters to determine if some known frequencies have occurred. The filtering method has no difficulty setting the receiver centers at arbitrary frequencies. But it is computationally very demanding in the digital domain especially when the number of frequencies which need to be detected are many.

In contrast, the DFT method, through the use of the very efficient Goertzel algorithm for calculating the DFT, requires much less computation and therefore is often the best choice in designing complex signal detectors. However, in the conventional implementations the center frequencies of the receiver can not be arbitrarily set. They are limited to those integer points in normalized frequency representing the frequency bands of the DFT. Unless the frequencies under detection are perfectly lined up with those integer points of the DFT, the receiver center frequencies cannot be precisely set to all the detection frequencies simultaneously. There is a need for a receiver which allows the center frequencies to be set at non-integer points as well, thus allowing arbitrary allocation of center frequencies of the receiver.

The following is a review how the DFT method is used in signal detection. Let $$X(k) = \sum_{n=0}^{N-1} x(n) W_N^{kn} \qquad (1)$$

where $k=0, 1, \ldots, N-1$ and $W_N^{kn} = e^{-j(2\pi k/N)}$ be the N-point DFT for signal $x(n)$. Let $f_s$ be the sampling frequency. Without loss of generality, assume N is even. Note that the DFT divides the useful spectrum $0-f_s/2$ into N/2 frequency bands with centers at integer points $k=0, 1, \ldots, (N/2)-1$ corresponding to frequencies $(k/N) f_s$. Let $f_1, f_2, \ldots f_m$ be the frequencies to be detected. The design of a signal detector involves first selecting the proper data length N of the DFT so that the quantities $(Nf_i/f_s)$, $i=1, 2, \ldots, m$, are very close to integers. Note that this may not be trivial. Let $k_i = \text{int}(Nf_i/f_s)$, $i=1, 2, \ldots, m$ be those integers. The frequency components $X(k_i)$ for $f_i$ are then computed from equation (1) at integer points $k_i$. $X(k_i)$ are then used for detecting frequency $f_i$. The detector center frequencies are at $k_i$, or $(k_i/N)f_s$ in actual frequency.

Since it's generally not possible to select a reasonable (can not be too large) data length N such that $(Nf_i/f_s)$ is an integer for all i, $(k_i/N)f_s$ in general does not equal to $f_i$. So the receiver center frequencies cannot be precisely allocated at $f_i$ for all i. Let the difference it represents from index k of the DFT to index k+1 be 100%, then these center frequencies $k_i$ can differ from the actual detection frequencies $(Nf_i/f_s)$ by as much as 50%. When this is the case, the detector can easily miss a frequency entirely at one end if the actual input frequency varies from its nominal frequency slightly, or falsely detect another frequency as $f_i$ at the other if that frequency is close to $f_i$. This is the least desired situation for signal detection because the quality and accuracy suffers when the receiver center frequency cannot be set precisely. There is a need for a receiver employing a technique that will solve this problem and further simplify the usual computations involved.

The Goertzel algorithm for evaluating the DFT in equation (1) can be stated as follows. For each integer k it requires only one parameter and two storage locations and therefore is very efficient in both computation and memory usage.

$$Q_k(n) = 2C_k Q_k(n-1) - Q_k(n-2) + x(n) \qquad (2)$$

where $C_k = \cos(2\pi k/N)$, $Q_k(-1) = Q_k(-2) = 0$, and $n = 0, 1, \ldots, N-1$. And $$|X(k)|^2 = Q_k(N-1)^2 + Q_k(N-2)^2 - 2C_k Q_k(N-1) Q_k(N-2) \qquad (3)$$

The first equation (2) is iterated N samples and the second equation (3) is calculated once at the end of Nth sample. In actual signal detector design, these are the equations used for calculating the frequency component $X(k)$. The Goertzel algorithm is just a means to efficiently calculate the DFT. The limitations mentioned above are not caused by this algorithm, but result from the definition of the classic DFT itself.

SUMMARY OF THE INVENTION

It is object of this invention to provide a multi-tone receiver which permits precise settings of the center frequencies thereby providing improved accuracy and quality.

It is another object of this invention to provide a multi-frequency receiver for detecting tones within a plurality of frequency bands in which accurate spectral information of the incoming signal is detected and the tolerances at each edge of the bands are the same, thereby improving the accuracy of the receiver.

It is an object of this invention to provide a multi-frequency receiver having arbitrarily setable center frequencies which are independent of the selection of data length N of the signal window.

It is another object of this invention to provide a multi-frequency receiver wherein the data length implemented by the receiver is independent of the frequencies of the tones to be detected.

It is another object of this invention to provide a multi-frequency receiver wherein no optimal data length needs to be calculated and the data length used for each frequency band is equal so that multiple data lengths are unnecessary.

It is another object of this invention to provide a multi-frequency receiver wherein the center frequencies are independent of any integers of any DFT so that calculation of such integers is unnecessary to determine the spectral energy in each frequency band.

It is another object of this invention to provide a multi-frequency receiver having a frequency band whose bandwidth is symmetric and is only a function of the data length used.

It is another object of this invention to provide a receiver employing computations which are simplified.

It is another object of this invention to provide a fast, efficient, and accurate receiver and method of calculating the spectral energies of a signal at some known frequencies.

It is also an object of this invention to provide a DTMF receiver having greater flexibility, more precise controls and higher accuracy than achieved in designs using conventional DFT method.

Other objects and features will be in part apparent and in part pointed out hereinafter.

BRIEF DESCRIPTION OF THE DRAWINGS

FIG. 3 is a flow chart of the process executed by the digital signal processor to calculate the spectral energy $|X(f_i)|^2$ within each preset frequency band defined by its center frequency $f_i$ which coincides with the frequency of the tone to be detected.

FIG. 6 is a diagram of the decision logic of a dual tone multi-frequency receiver according to the invention.

Corresponding reference characters indicate corresponding parts throughout the drawings.

DETAILED DESCRIPTION OF THE PREFERRED EMBODIMENT

Figure 1:
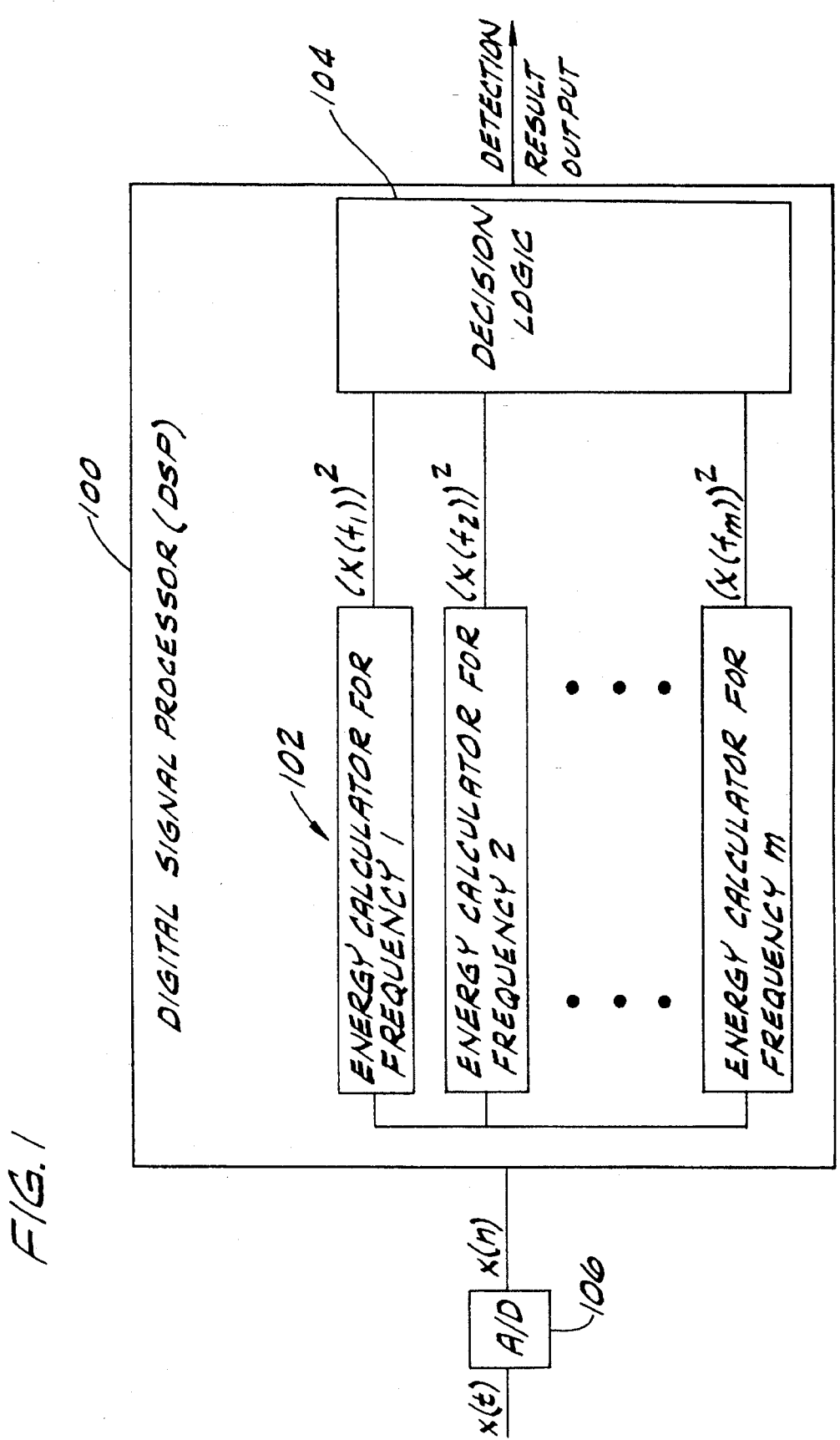
FIG. 1 is a block diagram of a digital multi-frequency receiver according to the invention including a digital signal processor with m frequency bands for detecting m tones.

Referring to FIG. 1, a block diagram of a digital signal detector according to the invention is illustrated. The detector includes a digital signal processor (DSP) 100 having frequency bands 102 which may be implemented in hardware or in software. In hardware form, the processor 100 includes a plurality of m separate hardware channels, each for calculating a spectral energy within a band corresponding to a preset frequency. In software form, the software separately calculates the spectral energy in each of the bands corresponding to each frequency. The spectral energy calculated for each channel 102 is evaluated by a decision logic 104. In general, the decision logic (in hardware or software) compares the calculated spectral energy for all bands 102 to predefined thresholds. As a result, the decision logic 104 indicates whether a particular tone $f_i$ has been detected within a frequency band when the calculated spectral energy equals or exceeds the predefined thresholds. In this way, the presence of particular tones within the incoming signal x(t) is indicated. Preferably, the incoming signal is converted to a digital signal x(n) by an analog-to-digital (A/D) converter 106, although it is contemplated that analog signal processing may be desirable in certain configurations. However, the decision logic can take various hardware and/or software forms such as described in greater detail with regard to FIG. 6 below. It should be recognized that different signals and different applications may require slightly different decision logics. Frequently, proprietary techniques are used in the decision logic to distinguish speech from regular multi-frequency tones. The output from the decision logic 104 may be provided either to a host processor or some sort of display so that information either can be conveyed or used for further processing.

Spectral energy is the most important information used in frequency detection. It is contemplated that the invention may readily be applied to all single or multi-frequency signal detectors or receivers such as DTMF (described below with regard to FIG. 6), multi-frequency codes (MFC) and precision call progress tones receivers. In general, the invention may be used whenever it is necessary to extract certain frequency information from an incoming signal.

Figure 2A:
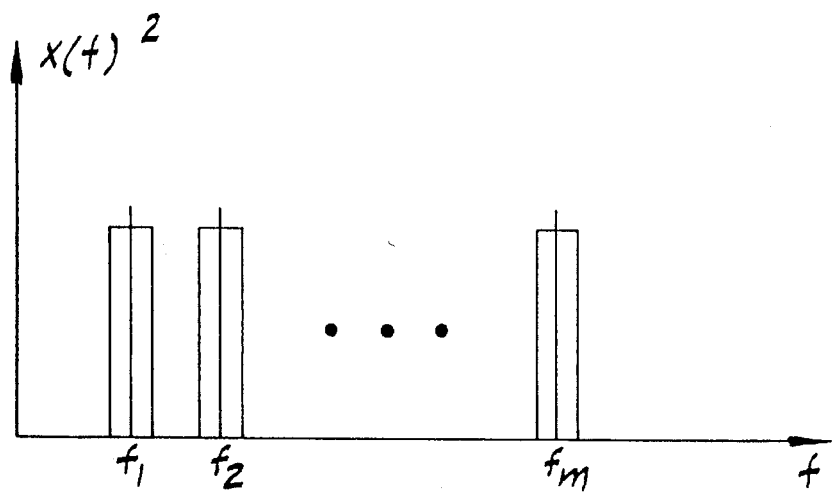
FIG. 2A is a graph which illustrates that each frequency band of the receiver of FIG. 1 is ideally centered at the frequency $f_i$ of the tone to be detected by the band.

In operation, the input signal x(n) feeds into the various energy calculators or frequency band channels 102 which output the spectral energy of the given frequency bands every N samples where N is the data length of the signal window in the frequency-energy calculators. The spectral energy is then analyzed by the decision logic 104 which analyzes the energies to determine if a known multi-frequency signal has occurred at the input. One key aspect of the invention is the accurate and efficient frequency-energy calculations. In particular, each channel 102 is configured such that the center frequency of the frequency band is located precisely at the frequency to be detected, thus allowing all frequency tones to be detected accurately and simultaneously for all the frequencies under detection. FIG. 2A illustrates this aspect of the invention in that the energy calculators are ideally centered at all the frequencies simultaneously. This greatly improves the accuracy of the receiver. It is contemplated that the technique according to the invention may be applied to all single, dual or multi-frequency detectors or receivers, particularly those used in telecommunications systems.

Figure 2B:
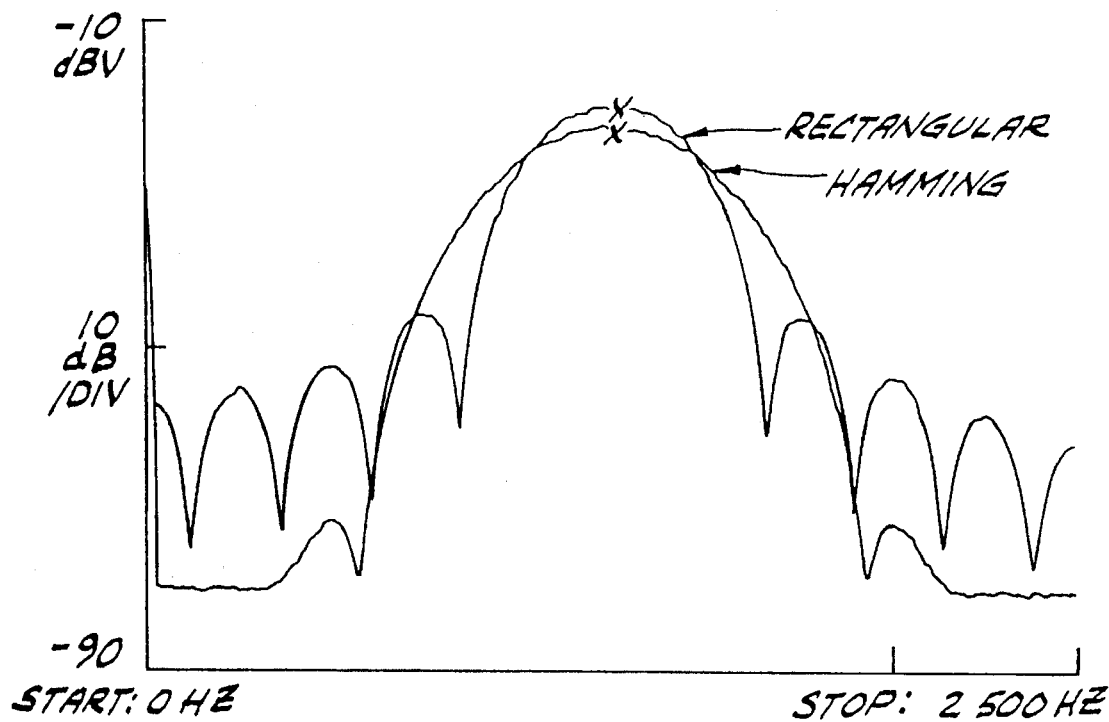
FIG. 2B illustrates the frequency response of a bandpass filter comparing Hamming and rectangular windows.

It is further contemplated that the spectral energy information can be made even more accurate by reducing the leakage of one frequency to another, which is typical for DFT, by applying some non-square windowing to the input signal. Each sample within each data frame may be weighted in the time domain by some windowing parameter such as Hamming, Hanning or Kaiser windows which provide up to −43 dB attenuation to leakage. The effect of non-square windows on the frequency bands is illustrated in FIG. 2B. The Hamming window offer more outband attenuation than a rectangular window in the frequency domain as FIG. 2B illustrates. Therefore, there is less leakage of one frequency into another band. Such windowing technique is particularly advantageous in the invention because the bands are centered about the tones to be detected. In the prior art, such window weighting could cause receive errors for tones near the edges of the frequency bands.

The following defines this new technique according to the invention in the form of a theorem and its derivations.

Theorem:

The frequency components $X(f_i)$ for $f_i$, i=1, 2, ..., m can be calculated from the following equations:

$$Q_i(n)=2C_iQ_i(n-1)-Q_i(n-2)+x(n) \quad (4)$$

where $C_i=\cos(2\pi f_i/f_s)$, $Q_i(-1)=Q_i(-2)=0$, and n=0,1, ... ,N−1. And $$|X(f_i)|^2=Q_i(N-1)^2+Q_i(N-2)^2-2C_iQ_i(N-1)Q_i(N-2) \quad (5)$$

Using these equations, the center frequencies of the designed detector are at exactly $f_i$.

Compared to the DFT method which uses the Goertzel algorithm (2)–(3), the only difference of this new algorithm is in the parameters $C_i$, instead of using $\cos(2\pi k/N)$, $\cos(2\pi f_i/f_s)$ is used. Note that $C_i$ now is only a function of $f_i$ and $f_s$ but does not involve any DFT band index K or the data length N.

Proof of the Theorem:
Consider $$X(k+\delta) = \sum_{n=0}^{N-1} x(n) W_N^{(k+\delta)n} \quad (6)$$

where $W_N^{(k+\delta)n} = e^{-j[2\pi(k+\delta)/N]n}$ and $|\delta|<0.5$. It can be rewritten as $$X(k+\delta) = \sum_{n=0}^{N-1} y(n) W_N^{kn} \quad (7)$$

where $y(n)=x(n)e^{-j(2\pi\delta/N)}$. By definition, equation (7) is the DFT of some signal y(n). The following shows that y(n) is x(n) after some fixed frequency shift from the signal detection point of view. It is sufficient to assume that $x(t)=\cos(2\pi ft)$, or $x(n)=\cos(2\pi fn/f_s)$ in discrete form. Let $\omega 2\pi f/f_s$ and $\Delta\omega=2\pi\delta/N$. Then $$\begin{aligned}y(n) &= \cos(2\pi fn/f_s)e^{-j(2\pi\delta/N)n} = (1/2)(e^{j\omega n}+e^{-j\omega n})e^{-j\Delta\omega n} = \\ &(1/2)(e^{j(\omega-\Delta\omega)n}+e^{-j(\omega+\Delta\omega)n}) = \cos[(\omega-\Delta\omega)n] + \\ &(1/2)(e^{-j(\omega+\Delta\omega)n} - e^{-j(\omega-\Delta\omega)}) = \cos[(\omega-\Delta\omega)n] + \\ &(1/2)(e^{j[2\pi-(\omega+\Delta\omega)]n} - e^{j[2\pi-(\omega-\Delta\omega)]n})\end{aligned} \quad (8)$$

The first term is x(n) after the frequency shift $\Delta\omega$. Without loss of usefulness and generality, assume $0<\omega+\Delta\omega$, $\omega-\Delta\omega<\pi$. Then $2\pi-(\omega+\Delta\omega)>\pi$ and $2\pi-(\omega-\Delta\omega)>\pi$, and the second term in equation (8) represents frequency components greater than the Nyquist frequency of the system. Their effect on the frequencies of interest, that is for $k=0, 1, \ldots, (N/2)-1$, are zero except causing very small leakage term due to the nature of DFT. Therefore, from the signal detection point of view, equation (6) becomes $$X(k+\delta) = \sum_{n=0}^{N-1} y(n) W_N^{kn} = \quad (9)$$

$$\sum_{n=0}^{N-1} \cos[(\omega-\Delta\omega)n] W_N^{kn} = \sum_{n=0}^{N-1} x[(\omega-\Delta\omega)n] W_N^{kn} = Y(k)$$

Thus equation (6) is equivalent to first shifting x(n) by $\Delta\omega$ and then calculating its DFT. This is further equivalent to shifting the spectrum of x(n) by $\Delta\omega$ in the frequency domain. The detection center frequency using equation (9) is $$(2\pi k/N)+\Delta\omega=(2\pi k/N)+(2\pi\delta/N)=2\pi(k+\delta)/N \quad (10)$$

in normalized frequency, or $$[(k+\delta)/N]f_s \quad (11)$$

in actual frequency.

Now by letting $\delta_i=(Nf_i/f_s)-k_i$ and applying the Goertzel algorithm, where $k_i$ are the closest integers to $(Nf_i/f_s)$, and noting that $X(f_i)=Y(k_i)$, we arrive at the first part of the theorem. Next, from equation (11), the detection center frequencies are given by $$[(k_i+\delta_i)/N]f_s=[f_i/f_s]f_s=f_i. \quad (12)$$

The following results follow immediately from above Theorem, their practical implication being significant:

1). The detection center frequencies can be arbitrarily set to any desired frequencies; and 2). The data length N can be more freely chosen.

Figure 4:
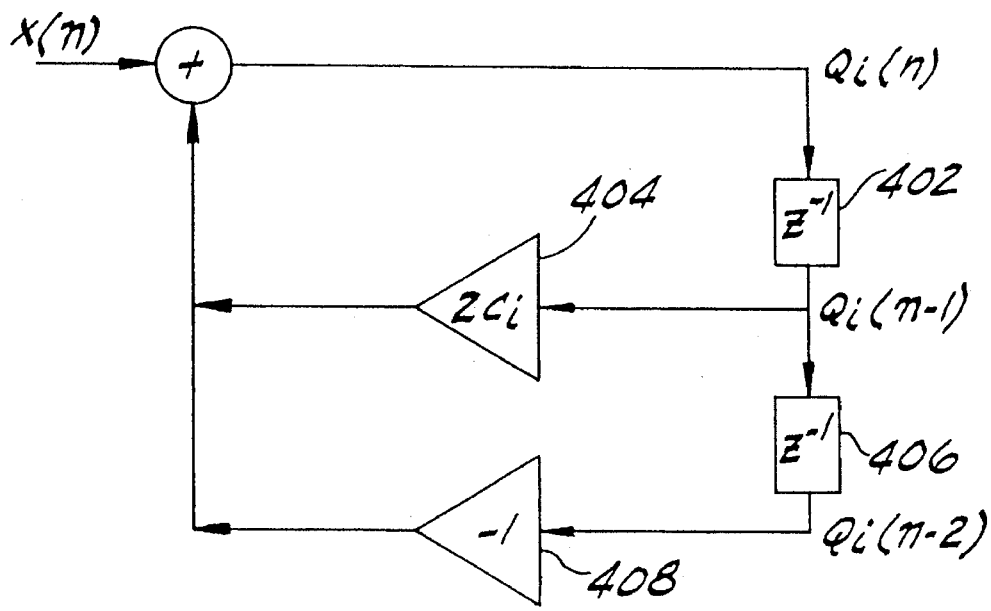
FIG. 4 is a diagram of the implementation of the feedback phase of the process of FIG. 3 of the digital signal processing algorithm according to the invention.
Figure 5:
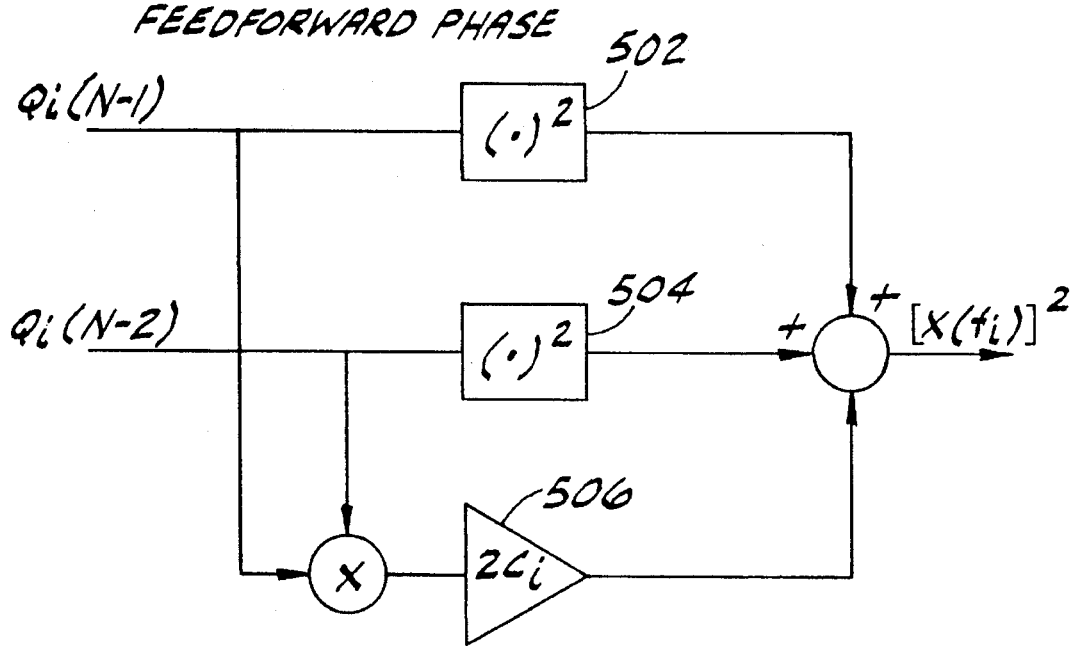
FIG. 5 is a diagram of the implementation of the feed forward phase of the process of FIG. 3 of the digital signal processing algorithm according to the invention.

Referring to FIG. 3, a flow chart implementing the above-noted theorem and illustrating the calculations involved in calculating the energy within a frequency band centered around frequency $f_i$ is illustrated. As shown by the dashed line, the upper portion of the flow chart is a feedback phase which may be implemented in a manner as illustrated in FIG. 4. When the feedback phase is completed, its output becomes the input for a feed forward phase shown below the dashed line and which may be implemented according to the diagram as illustrated in FIG. 5.

Initially, at step 302, $Q_i(-1)$ and $Q_i(-2)$ are set to zero along with $n=0$. At step 304, the particular sample of the digital signal x(n) is processed at step 304 according to equation (4) in which the parameter $C_i$ is defined by box 306 and is independent of the data length N as noted above. As long as n is less than N−1, decision step 308 takes the feedback branch in which the value for n is incremented by one by step 310 and the calculation according to equation (4) is again executed by step 304.

When the value of n equals or exceeds N−1, the Yes branch of decision step 308 is followed to begin the feed forward phase of operation. In this phase, step 312 calculates the spectral energy according to equation (5) and then returns to start to calculate the spectral energy for the next frame.

FIG. 4 shows an implementation of the feedback phase of FIG. 3. Delay 402 delays the sample value $Q_i(n)$ by one sample to provide an output of $Q_i(n-1)$ which is then processed according to twice the $C_i$ parameter as shown by parameter box 404. In addition, delay 406 delays the signal value $Q_i(n-1)$ one additional sample to provide $Q_i(n-2)$ which is multiplied by −1 as shown by parameter box 408. The outputs of parameter boxes 404 and 408 are added to the incoming sample to complete the implementation of step 304.

Similarly, FIG. 5 illustrates implementation of the feed forward phase after completion of the feedback phase. The sample of $Q_i(N-1)$ is squared by function box 502. To this squared value is added the square of $Q_i(N-2)$ generated by function box 504. To this sum is subtracted the product of $Q_i(N-1)$ and $Q_i(N-2)$ which has been multiplied by the parameter $2C_i$ as illustrated by parameter box 506. This amount is subtracted from the sum to provide the spectral energy and implementation of step 312.

The following is sample code for calculating the feedback phase according to FIG. 4. A data length N=200 is used. There are eight frequency bands:

```
**********************************************************
*    FEEDFORWARD PHASE CALCULATION, N=200
*    LOOP: Q(n) = 2*Ci*Q(n-1)*Q(n-2) + x(n)
*
         LARK    0,7
         LRLK    1,C8
         LRLK    2,D82
         LARP    1
         SPM     1
*
FBLP1    LT      *-,2
         LRLK    3,x199
         LRLK    4,199
*
FBLP2    ZALH    *-,2
         SUBH    *-
         MPY     *
         DMOV    *
         APAC
         APAC
         SACH    *+,0,4
         BANZ    FBLP2,*-,3
*
         LARP    2
```

-continued

```
        MAR *-
        MAR *-,0
        BANZ FBLP1,*-,1
        SPM 0
```

The following is sample code for calculating the feedforward phase according to FIG. 5:

```
*************************************************************
*   FEEDFORWARD PHASE CALCULATION
*   IX(fi) I**2 = Q(N-1)**2 +
    Q(N-2)**2 - 2*CiQ(N-31 1)*Q(N-2)
*
        LARK 0,7
        LRLK 1,C8
        LRLK 2,D82
        LRLK 3,E8
        LARP 1
*
FBLP    LT *-,2
        MPY *-
        LTP *-
        SACH TEMP,1
        MPY TEMP
        PAC
        SQRA *-
        NEG
        SQRA *-,3
        APAC
        SACH *,0,0
        BANZ FFLP,*-,1
```

EXAMPLE OF ONE PREFERRED EMBODIMENT

A DTMF Receiver

Taking a DTMF receiver 600 as illustrated in FIG. 6 as an example, it can be seen that the new technique of the invention improves the accuracy and performance by more precise alignment of the receiver center frequencies, as well as how the computation is simplified.

In the DTMF receiver 600, eight frequencies f[8] ={697, 770, 852, 941, 1209, 1336, 1477, 1633} and their second harmonics g[8]={1394, 1540, 1702, 1882, 2418, 2672, 2954, 3266} need to be detected. The purpose of calculating the second harmonics is for talk-off discrimination. Using the conventional DFT method, first, the optimal data length $N_1$ for the primary frequencies and $N_2$ for the second harmonics need to be found, e.g., $N_1$=205 and $N_2$=201. The frequency components for f[i] and g[i] are then computed at the integer points k1[8]={16, 18, 20, 22, 28, 31, 38} and k2[8]={32, 35, 39, 43, 55, 61, 67, 74}. None of the frequencies is precisely centered. The largest alignment error is 27% for the base frequencies f[i] and 31% for the second harmonics g[i] as shown in Table 1 as follows. This alignment error shows up in the performance data regarding receiver centers in Table 2 as follows:

TABLE 2

ALIGNMENT ERROR OF CENTER FREQUENCIES OF CONVENTIONAL DFT

| Frequency | % change high | % change low |
|---|---|---|
| 697 | 2.5 | 3.5 |
| 770 | 3.7 | 2.3 |
| 852 | 3.9 | 1.7 |
| 941 | 3.3 | 1.7 |
| 1209 | 2.4 | 3.0 |
| 1336 | 2.3 | 2.5 |
| 1477 | 1.3 | 2.9 |
| 1633 | 2.4 | 1.6 |

As a result, the % change high and low differ considerably, and the receiver is not centered for those frequencies.

Using the new algorithm specified by the above theorem and keeping the same data lengths $N_1$ and $N_2$ as above, the following bandwidth data shown in Table 3 from tests using a MITEL Corporation DTMF test tape, Copyright 1973, 1980 results:

TABLE 3

ALIGNMENT ERRORS OF CENTER FREQUENCIES OF INVENTION

| Frequency | % change high | % change low |
|---|---|---|
| 697 | 3.6 | 3.4 |
| 770 | 2.6 | 3.3 |
| 852 | 2.6 | 2.5 |
| 941 | 2.5 | 2.6 |
| 1209 | 2.1 | 2.1 |
| 1336 | 2.0 | 1.8 |
| 1477 | 1.7 | 1.6 |
| 1633 | 1.6 | 1.5 |

As a result, the receiver 600 according to the invention is better centered for all the frequencies. In fact, there is zero alignment error for all the frequency bands. The slight difference in % change in the highs and lows of Table 3 is due to noise. It should be noted that the parameter $C_i$ in the new algorithm can be finely adjusted so that the receiver can be ideally centered for the frequencies it is detecting. Note also that it is unnecessary to use two different data lengths in the design of the invention.

TABLE 1

| Frequency | Actual Center | Closest Integer | % Error |
|---|---|---|---|
| Receiver center frequency errors for the primary frequencies: $N_1$ = 205. | | | |
| 697 | 17.86 | 18 | 14% |
| 770 | 19.73 | 20 | 27% |
| 852 | 21.81 | 22 | 19% |
| 941 | 24.11 | 24 | 11% |
| 1209 | 30.98 | 31 | 2% |
| 1336 | 34.24 | 34 | 24% |
| 1477 | 37.85 | 38 | 15% |
| 1633 | 41.85 | 42 | 15% |
| Maximum error: 27% (error range 0–50%) | | | |
| Receiver center frequency errors for the secondary frequencies: $N_2$ = 201. | | | |
| 1394 | 35.02 | 35 | 2% |
| 1540 | 38.69 | 39 | 31% |
| 1702 | 42.76 | 43 | 24% |
| 1882 | 47.29 | 47 | 29% |
| 2418 | 60.75 | 61 | 25% |
| 2672 | 67.13 | 67 | 13% |
| 2954 | 74.22 | 74 | 22% |
| 3266 | 82.06 | 82 | 2% |
| Maximum error: 31% (error range 0–50%) | | | |

The decision logic shown in FIG. 6 includes a threshold check 602 for each of the primary frequencies of the low frequency group and a threshold check 604 for each of the primary frequencies of the high frequency group. The spectral energy of all bands is jointly evaluated and compared to some complex thresholds to see if the spectral energy has shown certain patterns, e.g., combination of frequencies, relative amplitudes and twist, before the presence of a particular tone or tones can be detected. In particular, after each of the threshold checks 602 and 604, there is a peak validation 606, 608 followed by a second harmonic check 610, 612. In this second harmonic check, a peak of at least 9 dB below the peak validation is required before the high and low frequencies are compared by the twist check 614 after which the comparisons are decoded and an output digit is generated by circuitry 616.

The invention employs only two storage locations corresponding to delays 402 and 406 of FIG. 4 and one parameter corresponding to $C_i$ of parameter box 404 of FIG. 4 for each frequency band for calculating the feedback values needed for the feed forward phase. Furthermore, the feed forward phase then becomes a scalar calculation for calculating the spectral energy based on these values. Because the parameter $C_i$ is independent of the data length N, selection of the data length also becomes independent of the frequencies $f_i$ of the m tones allowing any data lengths to be chosen depending on the bandwidth desired. Consequently, the frequency bandwidth, i.e., resolution, becomes a function of the data length only and the bands are symmetric around frequencies $f_i$ under detection. The data length may be arbitrarily set so that in fact no optimum data length exists. Furthermore, the implementation according to the invention is independent of any integers of any DFT so that it is unnecessary to calculate the integers of the DFT to determine the spectral energy.

In the classical DFT approach, the integer points are used to determine the various receiver bands. As a result, the center frequency of each band is tied to the data length N. This is because the parameter $C_i = \cos(2\pi k/N)$. In contrast, the parameter $C_i = \cos(2\pi f_i/f_s)$ according to the invention is independent of N. This also eliminates the need for having two separate data lengths, one for the primary frequencies and one for the secondary frequencies. In general, multiple data lengths significantly complicate the calculations in the process.

The savings according to the invention in computation comes in two ways: First, for any given set of frequencies, one does not have to go through the sometimes lengthy process of determining the optimal data length N for the DFT. Instead, any reasonable number N can be used. For example, $N_1$ and $N_2$ above can be chosen to be 200. The data length N will simply affect the bandwidth of the receiver but not the center frequencies. Second, in a receiver which traditionally involves more than one data length, like the above example, only one data length is needed now. The controls in the digital signal processing algorithm can be considerably simplified and this in turn results in simplified computations and saved processing time.

Therefore, the invention introduces a new technique for multi-frequency detection which allows arbitrary and simultaneous allocation of detection center frequencies. This results in improved performance of the detector. A salient feature of the new method and receiver is that the sample length N can be arbitrarily chosen. Considerable time savings in design and computation are realized.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A multi-frequency receiver for receiving an incoming analog signal x(t) and for determining the presence of any of a plurality of m known frequencies $f_i$, i=1, 2, ..., m, in the incoming analog signal, said receiver comprising:
   a. a detector for detecting the incoming analog signal;
   b. an analog to digital converter for converting the detected incoming analog signal into a digital signal x(n) at a sampling frequency $f_S$; and
   c. a digital signal processor for analyzing the digital signal, said processor executing a software program implementing:
      i. means for defining a plurality of m frequency bands, each frequency band having a center frequency equal to one of the known frequencies $f_i$ to be detected;
      ii. means for calculating a spectral energy $|X(f_i)|^2$ within each frequency band according to the following algorithm:

$$Q_i(n) = 2C_i Q_i(n-1) - Q_i(n-2) + x(n)$$

where $C_i = \cos(2\pi f_i/f_S)$, $Q_i(-1) = Q_i(-2) = 0$, N is a preselected data length and n=0, 1, 2, ..., N-1; and $$|X(f_i)|^2 = Q_i(N-1)^2 + Q_i(N-2)^2 - 2C_i Q_i(N-1) Q_i(N-2);$$

and
      iii. decision logic for comparing the calculated spectral energy of each band to a predefined threshold for determining the presence of any of the m known frequencies $f_i$ in the incoming analog signal.

2. The receiver of claim 1 wherein the center frequencies of the frequency bands are set exactly and simultaneously at the frequencies $f_i$ under detection whereby the frequency bands can be centered on any of the known frequencies and the accuracy of the receiver is maximized.

3. The receiver of claim 1 wherein said digital processing algorithm has a feedback phase for calculating $Q_i(N-1)$ and $Q_i(N-2)$ and a feed forward phase for calculating the spectral energy $|X(f_i)|^2$ based on the values of $Q_i(N-1)$ and $Q_i(N-2)$ calculated in the feedback phase.

4. The receiver of claim 1 wherein the digital processing algorithm employs only two storage locations and only one parameter $C_i$ for calculating the spectral energy for each frequency band.

5. The receiver of claim 1 wherein the data length N of the algorithm implemented by the software program of the digital signal processor is independent of the m known frequencies $f_i$ to be detected whereby the data length may be preselected independent of the frequencies $f_i$.

6. The receiver of claim 1 wherein the center frequencies of the frequency bands implemented by the software program of the digital signal processor are independent of the data length N.

7. The receiver of claim 1 wherein the data length N may be arbitrarily set whereby no optimum data length needs to be calculated.

8. The receiver of claim 1 wherein the data length N is used for each frequency band so that multiple data lengths are unnecessary whereby the calculation of the algorithm is simpler.

9. The receiver of claim 1 employing a non-square window for the incoming digital signal whereby energy leakage of one frequency band into another frequency band is minimized.

10. The receiver of claim 1 wherein the bandwidth of each frequency band is symmetric about $f_i$ and can be exactly controlled by selection of the data length N, independent of the frequencies $f_i$ under detection.

11. The receiver of claim 1 wherein the calculation of the spectral energy is independent of any band indices $k_i$ of any discrete Fourier transform (DFT) whereby calculation of the band indices $k_i$ to match the frequencies $f_i$ in the conventional DFT approach is unnecessary.

12. The receiver of claim 1 for use with a DTMF signal system comprising known frequencies of 697, 770, 850, 941, 1209, 1336, 1477, and 1633 hz.

13. The receiver of claim 12 including decision logic for a low frequency group of 697, 770, 850 and 941 hz, and for a high frequency group of 1209, 1336, 1477 and 1633 hz, for selecting an outstanding frequency component within each group and comparing the selected component to its second harmonic.

14. The receiver of claim 12 including a twist check circuit for comparing the detected low frequency and high frequency components and a decoder for providing an output indicating a presence or absence of valid dual tones.

15. A receiving method for receiving an incoming analog signal x(t) and for determining the presence of any of a plurality of m known frequencies $f_i$, i=1, 2, ..., m, in the incoming analog signal, said receiver comprising the steps of:

a. detecting the incoming analog signal;

b. converting the detected incoming analog signal into a digital signal x(n) at a sampling frequency $f_S$;

c. determining the spectral energy $|X(f_i)|^2$ of the digital signal within each of a plurality of m frequency bands, each band having a center frequency equal to one of the known frequencies $f_i$ to be detected, said determining step employing the following algorithm:

$$Q_i(n)=2C_iQ_i(n-1)-Q_i(n-2)+x(n)$$

where $C_i=\cos(2\pi f_i/f_S)$, $Q_i(-1)=Q_i(-2)=0$, N is a preselected data length and n=0, 1, 2, ..., N-1; and $$|X(f_i)|^2=Q_i(N-1)^2+Q_i(N-2)^2-2C_iQ_i(N-1)Q_i(N-2);$$

and d. comparing the calculated spectral energy of each band to a predefined threshold for determining the presence of any of the m known frequencies $f_i$ in the incoming analog signal.

16. A multi-frequency receiver for receiving an incoming analog signal x(t) and for determining the presence of any of a plurality of m known frequencies $f_i$, i=1, 2, ..., m, in the incoming analog signal, said receiver comprising:

a. a detector for detecting the incoming analog signal;

b. an analog to digital converter for converting the detected incoming analog signal into a digital signal x(n) at a sampling frequency $f_S$; and c. a digital signal processor for analyzing the digital signal, said processor comprising:

i. a plurality of m frequency bands, each of which is centered at one of the known frequencies $f_i$ to be detected;

ii. means for calculating a spectral energy $|X(f_i)|^2$ within each frequency band according to the following algorithm:

$$Q_i(n)=2C_iQ_i(n-1)-Q_i(n-2)+x(n)$$

where $C_i=\cos(2\pi f_i/f_S)$, $Q_i(-1)=Q_i(-2)=0$, N is a preselected data length and n=0, 1, 2, ..., N-1; and $$|X(f_i)|^2=Q_i(N-1)^2+Q_i(N-2)^2-2C_iQ_i(N-1)Q_i(N-2);$$

and iii. decision logic for comparing the calculated spectral energy of each band to a predefined threshold for each band and for determining the presence of any of the m known frequencies $f_i$ in the incoming analog signal.

17. The receiver of claim 16 wherein said digital processing algorithm has a feedback phase for calculating $Q_i(N-1)$ and $Q_i(N-2)$ and a feed forward phase for calculating the spectral energy $|X(f_i)|^2$ based on the values of $Q_i(N-1)$ and $Q_i(N-2)$ calculated in the feedback phase.

18. The receiver of claim 16 wherein the digital processing algorithm employs only two storage locations and only one parameter $C_i$ for calculating the spectral energy for each frequency band.

* * * * *